(12) United States Patent
Huang (10) Patent No.: US 11,372,501 B1
(45) Date of Patent: Jun. 28, 2022

(54) CONTROL METHOD AND CONTROL CIRCUIT FOR FINGERPRINT SENSING

(71) Applicant: NOVATEK Microelectronics Corp., Hsinchu (TW)

(72) Inventor: Min Huang, Taoyuan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/315,370

(22) Filed: May 10, 2021

(51) Int. Cl.
*G06F 3/041* (2006.01)

(52) U.S. Cl.
CPC ........ *G06F 3/04166* (2019.05); *G06F 3/0414* (2013.01)

(58) Field of Classification Search
CPC .... G06F 3/04166; G06F 3/0414; G06F 3/042; G06F 3/0421; H01L 27/14603; G06K 9/0004
See application file for complete search history.

(56) References Cited

U.S. PATENT DOCUMENTS

| | | | | |
|---|---|---|---|---|
| 9,007,252 B1* | 4/2015 | Hsu | ........................ | H03M 1/12 341/130 |
| 10,282,579 B2 | 5/2019 | Thompson et al. | | |
| 2008/0239124 A1* | 10/2008 | Mori | ..................... | H04N 5/3658 348/E3.018 |
| 2012/0112940 A1* | 5/2012 | Sohn | ..................... | H03M 1/162 341/155 |
| 2014/0042300 A1* | 2/2014 | Hsu | ........................ | H04N 5/378 341/137 |
| 2016/0358003 A1 | 12/2016 | Shen et al. | | |
| 2018/0359440 A1* | 12/2018 | Kobayashi | ........... | H04N 5/3577 |
| 2020/0381466 A1* | 12/2020 | Chen | .................. | H04N 5/37455 |

FOREIGN PATENT DOCUMENTS

| | | |
|---|---|---|
| CN | 107077613 B | 1/2019 |
| CN | 111033511 A | 4/2020 |
| TW | 201419095 A | 5/2014 |
| TW | 201921289 A | 6/2019 |
| TW | I666590 B | 7/2019 |
| WO | 2020108225 A1 | 6/2020 |

* cited by examiner

*Primary Examiner* — Hong Zhou
(74) *Attorney, Agent, or Firm* — CKC & Partners Co., LLC (57) ABSTRACT

A control method for fingerprint sensing includes following steps. First fingerprint brightness codes detected in reference with a ramp-counting variable varying in a full range are received during a pre-scanning phase. An initial code is generated according to a distribution of the first fingerprint brightness codes. The initial code is applied to the ramp-counting variable during a normal scanning phase for detecting second fingerprint brightness codes in reference with the ramp-counting variable varying in a partial range. A boundary of the partial range is determined according to the initial code. A control circuit is also disclosure.

20 Claims, 11 Drawing Sheets

CONTROL METHOD AND CONTROL CIRCUIT FOR FINGERPRINT SENSING

BACKGROUND

Field of Disclosure

The present disclosure relates to a control method and a control circuit for fingerprint sensing. More particularly, the present disclosure relates to a control method and a control circuit involving a ramp-counting manner for fingerprint sensing.

Description of Related Art

For an optical fingerprint sensor that is integrated inside of the LCD panel (e.g., an in-display fingerprint sensor), incident light generated by a light source hits a human finger to produce reflected light, and the reflected light is received by an optical sensor, which can convert the reflected light into input voltage signals. Then, a readout circuit may convert the input voltage signals into a digital signal and transmits the digital signal to a processor for further image processing.

The readout circuit will utilize a ramp voltage repeatedly varying in a full range to convert the input voltage signals into the digital signals. However, in general cases, voltage levels of the input voltage signals usually gather within a specific voltage region (e.g., about 20% to 40% of the full range). A variation of the ramp voltage outside the specific voltage region is not required. It is not time efficient to use the ramp voltage repeatedly varying in the full range.

SUMMARY

An aspect of the present disclosure is to provide a control method, which includes following steps. First fingerprint brightness codes detected in reference with a ramp-counting variable varying in a full range are received during a pre-scanning phase. An initial code is generated according to a distribution of the first fingerprint brightness codes. The initial code is applied to the ramp-counting variable during a normal scanning phase for detecting second fingerprint brightness codes in reference with the ramp-counting variable varying in a partial range. A boundary of the partial range is determined according to the initial code.

Another aspect of the present disclosure is to provide a control method, which includes following steps. First fingerprint brightness codes detected in reference with a ramp-counting variable varying at a first clock frequency in a full range are received during a pre-scanning phase. An initial code is generated according to a distribution of the first fingerprint brightness codes detected during the pre-scanning phase. The ramp-counting variable is set with different clock frequencies based on the initial code during a normal scanning phase for detecting second fingerprint brightness codes in reference with the ramp-counting variable. The ramp-counting variable varies at a second clock frequency in a first portion, before the initial code within the full range. The ramp-counting variable varies at the first clock frequency in a second portion, after the initial code within the full range. The second clock frequency is higher than the first clock frequency.

Another aspect of the present disclosure is to provide a control circuit, which is suitable for an electronic device including optical sensors and a readout circuit. The optical sensors are configured to generate optical-sensing voltage signals. The readout circuit is configured to compare the optical-sensing voltage signals respectively with a ramp voltage signal for detecting fingerprint brightness codes. The control circuit includes a digital counter, a ramp converter and a controller. The digital counter is configured to count a ramp-counting variable. The ramp converter is coupled with the digital counter, and the ramp converter is configured to generate the ramp voltage signal with varying voltage levels positively correlated to the ramp-counting variable. The controller is coupled with the digital counter and the readout circuit.

In some aspects, the controller is configured to trigger the digital counter to count a ramp-counting variable varying in a full range during a pre-scanning phase; receive first fingerprint brightness codes from the readout circuit in reference with the ramp-counting variable varying in the full range during the pre-scanning phase; generate an initial code according to a distribution of the first fingerprint brightness codes detected during the pre-scanning phase; trigger the digital counter to count the ramp-counting variable in a partial range during a normal scanning phase, wherein a boundary of the partial range is determined according to the initial code; and receive a plurality of second fingerprint brightness codes from the readout circuit in reference with the ramp-counting variable varying in the partial range during the normal scanning phase.

Another aspect of the present disclosure is to provide a control circuit, which is suitable for an electronic device including optical sensors and a readout circuit. The optical sensors are configured to generate optical-sensing voltage signals. The readout circuit is configured to compare the optical-sensing voltage signals respectively with a ramp voltage signal for detecting fingerprint brightness codes. The control circuit includes a digital counter, a ramp converter and a controller. The digital counter is configured to count a ramp-counting variable. The ramp converter is coupled with the digital counter, and the ramp converter is configured to generate the ramp voltage signal with varying voltage levels positively correlated to the ramp-counting variable. The controller is coupled with the digital counter and the readout circuit.

In some aspects, the controller is configured to trigger the digital counter to provide a ramp-counting variable varying at a first clock frequency in a full range during a pre-scanning phase; receive a plurality of first fingerprint brightness codes from the readout circuit in reference with the ramp-counting variable varying in the full range during the pre-scanning phase; generate an initial code according to a distribution of the first fingerprint brightness codes detected during the pre-scanning phase; trigger the digital counter to count the ramp-counting variable varying at a second clock frequency in a first portion before the initial code within the full range and count the ramp-counting variable varying at the first clock frequency in a second portion after the initial code within the full range during a normal scanning phase; and receive a plurality of second fingerprint brightness codes from the readout circuit in reference with the ramp-counting variable during the normal scanning phase.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
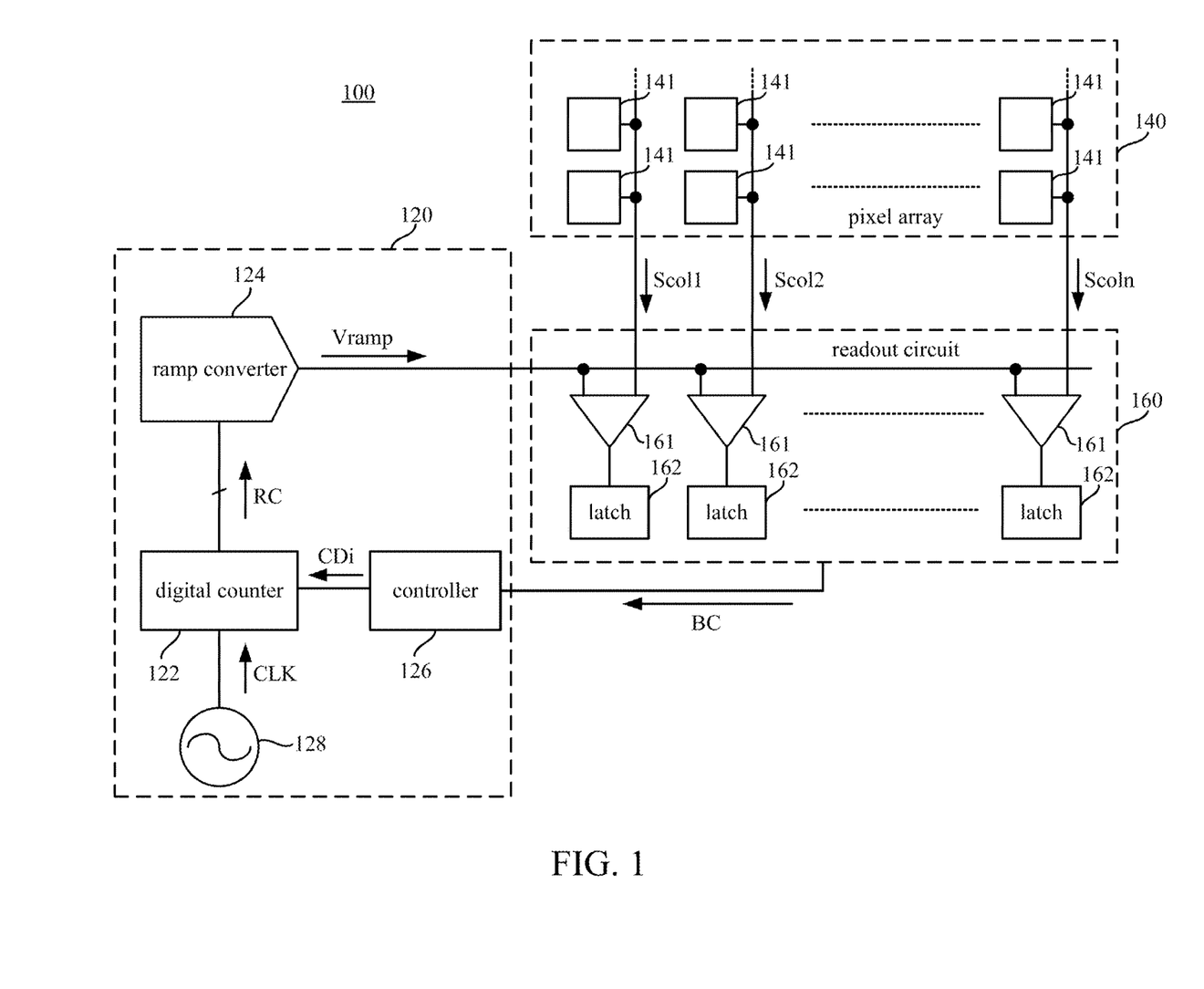
FIG. 1 is a schematic diagram illustrating a control circuit according to some embodiments of the disclosure.

FIG. 1 is a schematic diagram illustrating a control circuit 120 according to some embodiments of the disclosure. In some embodiments, the control circuit 120 is suitable for an electronic device 100 capable for sensing a fingerprint image. For example, the electronic device 100 can be a mobile phone, a smart phone, a tablet computer, a personal digital assistant (PDA), a computer or any equivalent device with a fingerprint sensing function.

As embodiments shown in FIG. 1, the electronic device 100 includes a pixel array 140 and a readout circuit 160. The pixel array 140 includes several optical sensors 141 arranged on different columns, and the optical sensors 141 are configured to generate optical-sensing voltage signals Scol1, Scol2 . . . Scoln. In the embodiments shown in FIG. 1, the pixel array 140 includes "n" different columns, and "n" is a positive integer larger than 1. For example, "n" can be 20, 40, 120, 360, 480, 720, 1080 or any suitable column amount. The disclosure is not limited to a specific column amount.

In order to detect a fingerprint on the pixel array 140, a light source (e.g., by a light emitter in the pixel array 140) can generate incident light, which can be reflected by a human finger. Therefore, the reflected light (from the human finger) can be sensed by the optical sensors 141, which generate the optical-sensing voltage signals Scol1-Scoln corresponding to the reflected light.

As shown in FIG. 1, the readout circuit 160 is coupled with the optical sensors 141 in the pixel array 140. The readout circuit 160 is configured to compare the optical-sensing voltage signals Scol1-Scoln respectively with a ramp voltage signal Vramp for detecting fingerprint brightness codes BC.

In some embodiments, the ramp voltage signal Vramp is utilized as a reference signal for deciding brightness levels of the optical-sensing voltage signals Scol1-Scoln to generate the fingerprint brightness codes BC. In some embodiments, the ramp voltage signal Vramp can be an upward staircase-like voltage signal with voltage levels gradually increasing in an ascending order, or a downward staircase-like voltage signal with voltage levels gradually decreasing in a descending order.

As embodiments shown in FIG. 1, the control circuit 120 is configured to generate the ramp voltage signal Vramp, and provide the ramp voltage signal Vramp to the readout circuit 160. The control circuit 120 includes a digital counter 122, a ramp converter 124, a controller 126 and an oscillator 128.

The digital counter 122 is configured to count a ramp-counting variable RC according to a clock frequency CLK generated by the oscillator 128. In some embodiments, the clock frequency CLK has a fixed period. The ramp-counting variable RC is increased or decreased by the digital counter 122.

For example, if the digital counter 122 is an 8-bits up-counter, in a default case, the ramp-counting variable RC is counted from a zero scale, 0, and then 1, 2, 3, 4 . . . , until the ramp-counting variable RC reaches a full scale, which is 255 for the 8-bits up-counter. If the digital counter 122 is an 8-bits down-counter, in a default case, the ramp-counting variable RC is counted from the full scale, 255, and then 254, 253, 252 . . . , until the ramp-counting variable RC reaches the zero scale, 0.

The ramp converter 124 is coupled with the digital counter 122. The ramp converter 124 is configured to generate the ramp voltage signal Vramp with varying voltage levels positively correlated to the ramp-counting variable RC. For example, when the ramp-counting variable RC is larger, the ramp voltage signal Vramp has a higher voltage level; when the ramp-counting variable RC is smaller, the ramp voltage signal Vramp has a lower voltage level. In some embodiments, the ramp converter 124 is a digital-to-analog converter (DAC) configured to convert a digital count value (i.e., the ramp-counting variable RC) into an analog voltage signal (i.e., the ramp voltage signal Vramp).

In an example, the ramp-counting variable RC is counted in a full range (started from 0, 1, 2, 3, 4 . . . until the full scale) such that the ramp voltage signal Vramp is generated in the full range from the lowest voltage level to the highest voltage level, as a reference voltage standard for detecting the fingerprint brightness codes BC. In most of cases, the fingerprint brightness codes BC does not distribute over the full range, and the fingerprint brightness codes BC are usually detected within a partial region (e.g., from 75 to 150) within the full range (e.g., from 0 to 255). It is not time efficient to detect the fingerprint brightness codes BC with the ramp-counting variable RC varying in the full range.

In some embodiments, the controller 126 is configured to generate an initial code CDi and trigger the digital counter 122 to count the ramp-counting variable RC within a partial range according to the initial code CDi. In this case, the controller 126 can speed up the process of detecting the fingerprint brightness codes BC on the electronic device 100. Details about how to generate the initial code CDi and count the ramp-counting variable RC within the partial range will be discussed in the following paragraphs.

Figure 2:
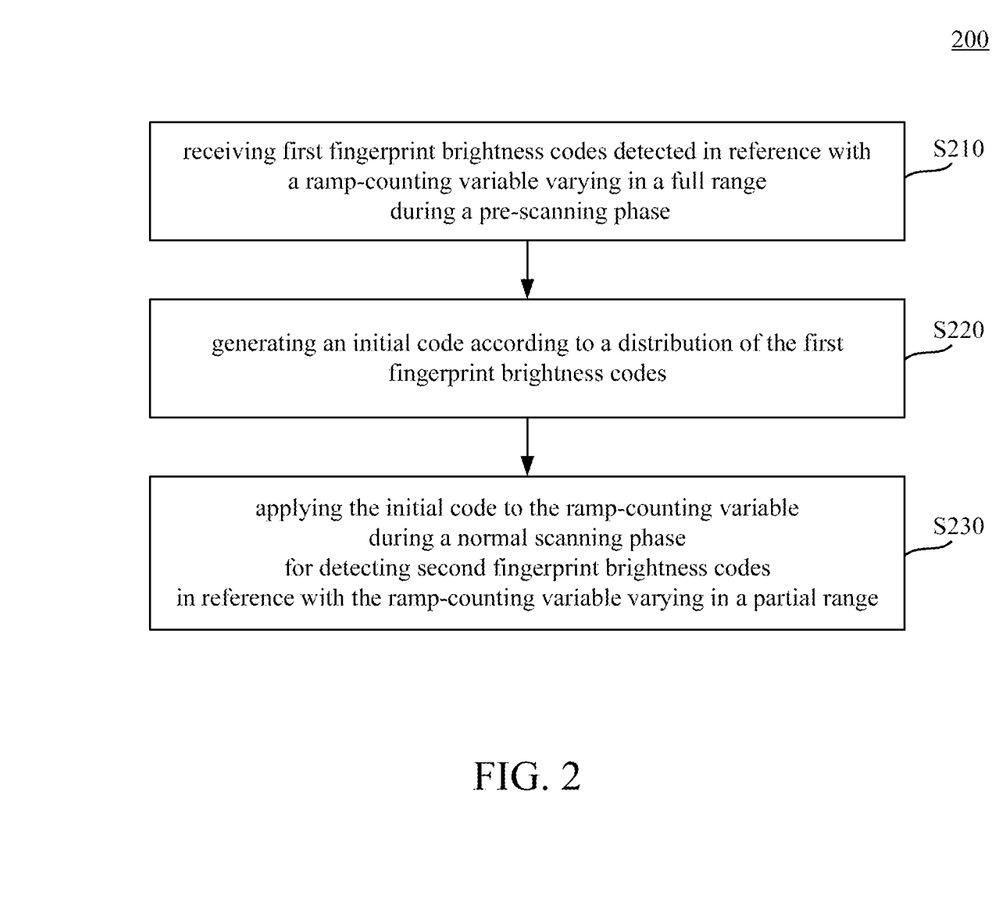
FIG. 2 is a flow chart illustrating a control method in some embodiments of the disclosure.

Reference is made to FIG. 2, which is a flow chart illustrating a control method 200 in some embodiments of the disclosure. The control method 200 can be executed by the control circuit 120 shown in FIG. 1.

According to the control method 200, a readout frame of detecting the fingerprint brightness codes BC may include a pre-scanning phase and a normal scanning phase after the pre-scanning phase. During the pre-scanning phase, step S210 is performed, the control circuit 120 receives first fingerprint brightness codes detected in reference with a ramp-counting variable RC varying in a full range during a pre-scanning phase.

Figure 3A:
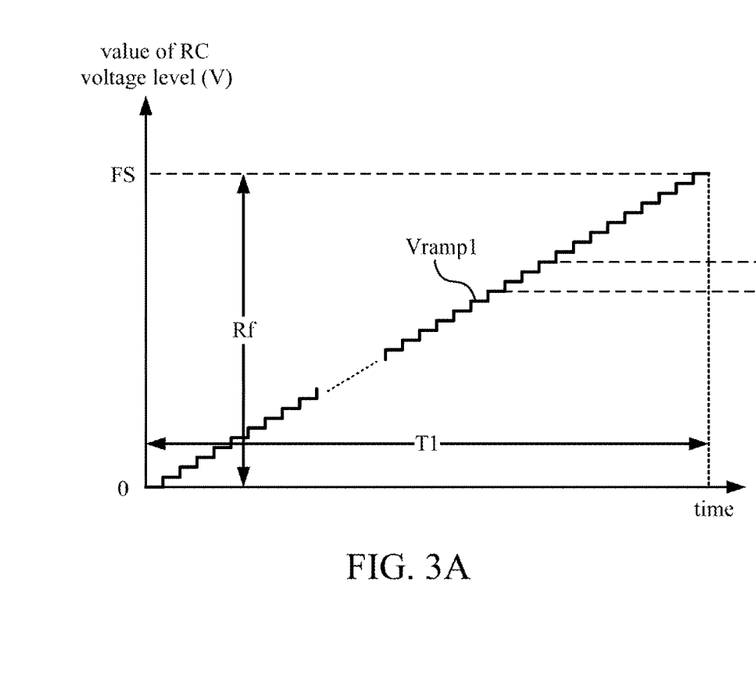
FIG. 3A is a schematic diagram illustrating a first ramp voltage signal generated according to the ramp-counting variable varying in a full range by the electronic device during the pre-scanning phase.

Reference is further made to FIG. 3A, which is a schematic diagram illustrating a first ramp voltage signal Vramp1 generated according to the ramp-counting variable RC varying in a full range Rf by the electronic device 100 during the pre-scanning phase.

During the pre-scanning phase, the controller 126 triggers the digital counter 122 to count the ramp-counting variable RC varying in a full range Rf during the pre-scanning phase. In the embodiment shown in FIG. 3A, the digital counter 122 count the ramp-counting variable RC in an ascending order started from a zero scale "0" to a full scale FS. For example, the full scale FS can be 15, 31, 63, 127, 255, etc. The number of the full scale FS depends on a resolution of the brightness grey levels in the fingerprint sensing. For brevity, it is assumed that the full scale FS is set at 255. In this case, the digital counter 122 counts the ramp-counting variable RC from 0, 1, 2, 3, . . . to 255. The digital counter 122 provides the ramp-counting variable RC to the ramp converter 124. The ramp converter 124 generates a first ramp voltage signal Vramp1 as shown in FIG. 3A with varying voltage levels positively correlated to the ramp-counting variable RC in the full range FS. In this case, the first ramp voltage signal Vramp1 also varies in the full ranges. The ramp converter 124 provides the first ramp voltage signal Vramp1 to the readout circuit 160. The comparators 161 in the readout circuit 160 compares optical-sensing voltage signals Scol1-Scoln with the first ramp voltage signal Vramp1, and comparison results from the comparators 161 are stored in the latches 162 for generating the first fingerprint brightness codes BC1.

Figure 3B:
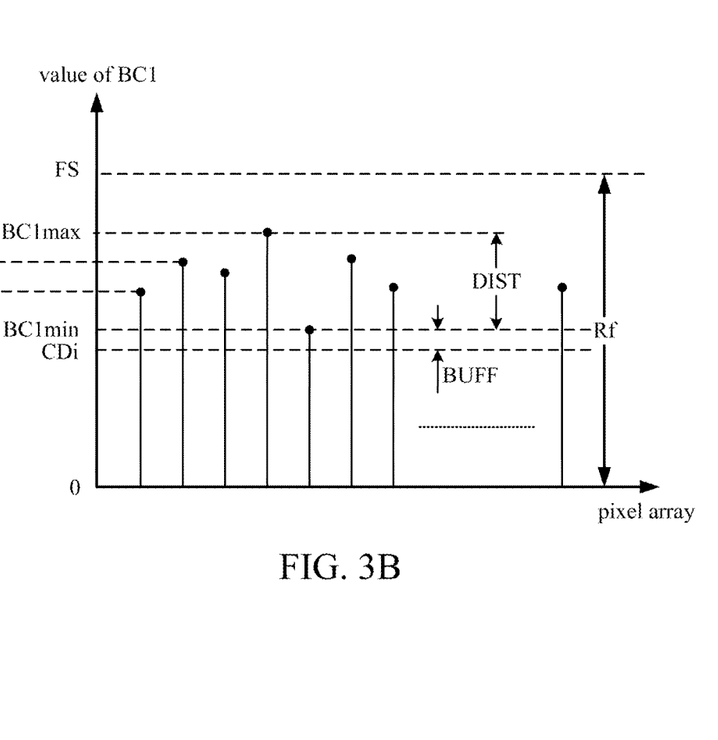
FIG. 3B is a schematic diagram illustrating the first fingerprint brightness codes generated in reference with the first ramp voltage signal in FIG. 3A during the pre-scanning phase.

Reference is made to FIG. 3B, which is a schematic diagram illustrating the first fingerprint brightness codes BC1 generated in reference with the first ramp voltage signal Vramp1 in FIG. 3A during the pre-scanning phase.

As shown in FIG. 3B, even the first fingerprint brightness codes BC1 are detected in reference with the first ramp voltage signal Vramp1 in the full range Rf, the first fingerprint brightness codes BC1 are usually not distributed evenly all over the full range Rf. As shown in FIG. 3B, according to the distribution DIST of the first fingerprint brightness codes BC1, it can decide a maximal code BC1max and a minimal code BC1 min among the first fingerprint brightness codes BC1.

Since the first fingerprint brightness codes BC1 are located between the minimal code BC1 min and the maximal code BC1max, it can save time by using another ramp voltage signal in a partial range for detecting the fingerprint brightness codes in the normal scanning phase.

As shown in FIG. 1, FIG. 2 and FIG. 3B, step S220 is performed by the control circuit 120 after receiving the first fingerprint brightness codes BC1, the controller 126 generates an initial code CDi according to the distribution DIST of the first fingerprint brightness codes BC1.

In an embodiment shown in FIG. 3B, corresponding to the ramp-counting variable RC in an ascending order, the initial code CDi can be generated according to the minimal code BC1 min. As shown in FIG. 3B, the initial code CDi can be set at the minimal code BC1 min minus a buffer gap BUFF. In some other embodiments, the initial code CDi can be equal to the minimal code BC1 min.

As shown in FIG. 1 and FIG. 2, step S230 is performed, by the control circuit 120, during a normal scanning phase, the control circuit 120 apply the initial code CDi to the ramp-counting variable RC for detecting second fingerprint brightness codes BC2 in reference with the ramp-counting variable RC varying in a partial range.

Figure 4A:
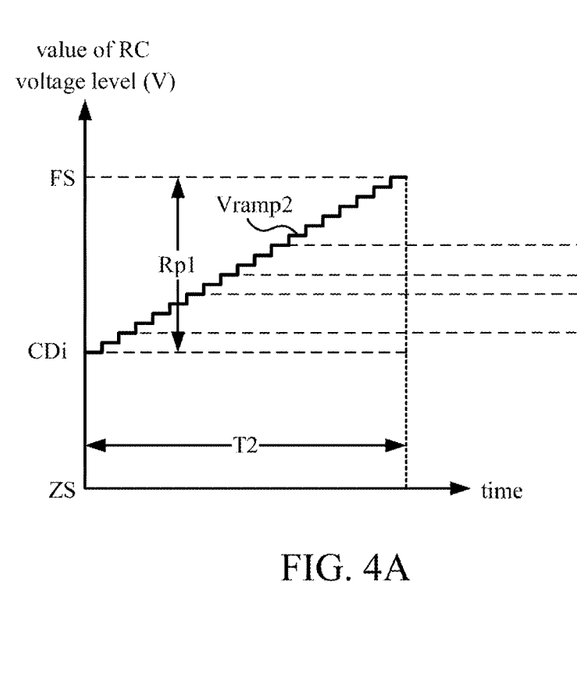
FIG. 4A is a schematic diagram illustrating a second ramp voltage signal generated according to the ramp-counting variable varying in a partial range during the normal scanning phase.

Reference is further made to FIG. 4A, which is a schematic diagram illustrating a second ramp voltage signal Vramp2 generated according to the ramp-counting variable RC varying in a partial range Rp1 during the normal scanning phase.

During the normal scanning phase, the controller 126 triggers the digital counter 122 to count the ramp-counting variable RC in a partial range Rp1. As shown in FIG. 4A, a boundary (e.g., a lower bound) of the partial range Rp1 is determined according to the initial code CDi. In other words, the digital counter 122 counts the ramp-counting variable RC starting from the initial code CDi, instead of starting from the zero scale ZS.

Figure 4B:
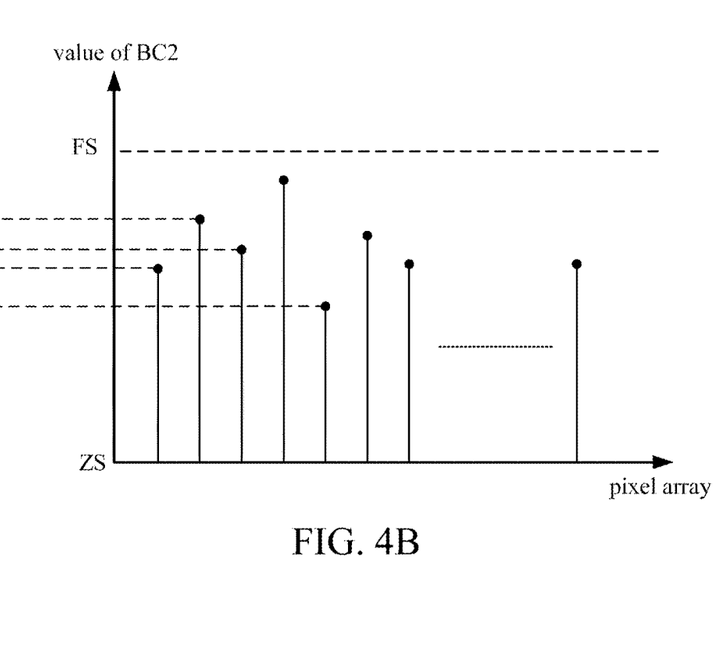
FIG. 4B is a schematic diagram illustrating the second fingerprint brightness codes generated during the normal scanning phase in some embodiments.

The digital counter 122 provides the ramp-counting variable RC in the partial range Rp1 to the ramp converter 124. The ramp converter 124 generates a second ramp voltage signal Vramp2 as shown in FIG. 4A with varying voltage levels positively correlated to the ramp-counting variable RC in the partial range Rp1. The ramp converter 124 provides the second ramp voltage signal Vramp2 to the readout circuit 160. The comparators 161 in the readout circuit 160 compares optical-sensing voltage signals Scol1-Scoln with the second ramp voltage signal Vramp2, and comparison results from the comparators 161 are stored in the latches 162 for generating the second fingerprint brightness codes BC2. FIG. 4B is a schematic diagram illustrating the second fingerprint brightness codes BC2 generated during the normal scanning phase in some embodiments.

In some embodiments, during the normal scanning phase, the ramp-counting variable RC can be counted starting from the initial code CDi instead of starting from the zero scale ZS. In this case, a cycle time T2, for the second ramp voltage signal Vramp2 varying in the partial range Rp1 in FIG. 4A, is shorter than a cycle time T1, for the first ramp voltage signal Vramp1 varying in the full range Rf in FIG. 3A. Therefore, it is more time efficient in the normal scanning phase by utilizing the second ramp voltage signal Vramp2 varying in the partial range Rp1.

Counting the ramp-counting variable RC started from the initial code CDi can save the cycle time. However, if the initial code CDi is not set properly, it will shift the corresponding ramp voltage signal to an improper range, and it is harmful for generating the fingerprint brightness codes.

In an example, different users may have different features on their fingers, such that the fingerprint brightness codes for different users' fingers may distribute on different ranges. In another example, the user's finger may contact the electronic device 100 in different ways from time to time, such that the fingerprint brightness code may also distribute on different ranges. If the initial code CDi is set at a fixed value regardless of different users or different situations, the fingerprint brightness codes generated with an improper reference can be invalid.

Based on aforesaid embodiments in this disclosure, the initial code CDi is determined according to the distribution DIST of the first fingerprint brightness codes BC1 as shown in FIG. 3B detected during the pre-scanning phase in step S220. Therefore, the initial code CDi is determined dynamically according to a current user and a current situation detected in the pre-scanning phase. Therefore, the control method 200 can generate the second fingerprint brightness codes BC2 quickly and accurately in step S230.

In aforesaid embodiments shown in FIG. 3A, FIG. 3B, FIG. 4A and FIG. 4B, the ramp-counting variable RC is counted in the ascending order and the initial code CDi is decided according to the minimal code BC1min among the first fingerprint brightness codes BC1, but the disclosure is not limited thereto.

Figure 5A:
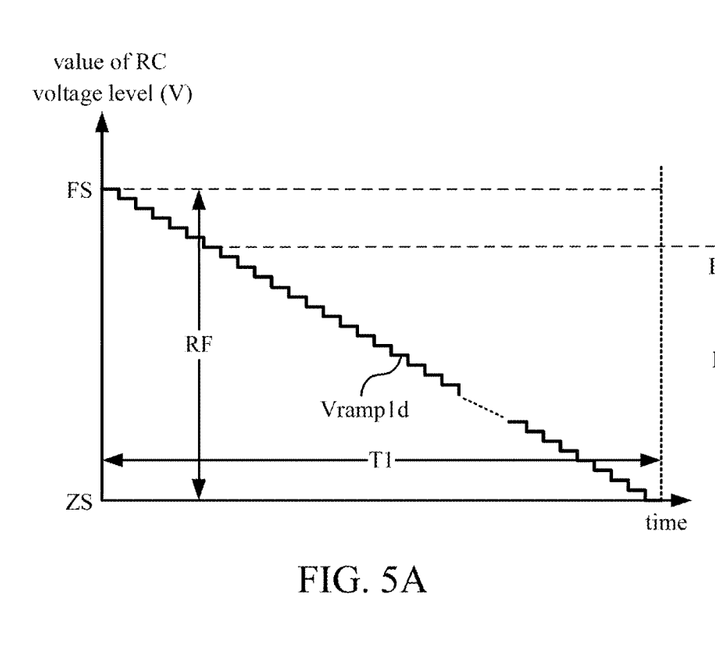
FIG. 5A is a schematic diagram illustrating a first ramp voltage signal generated according to the ramp-counting variable varying in a full range by the electronic device during the pre-scanning phase.
Figure 5B:
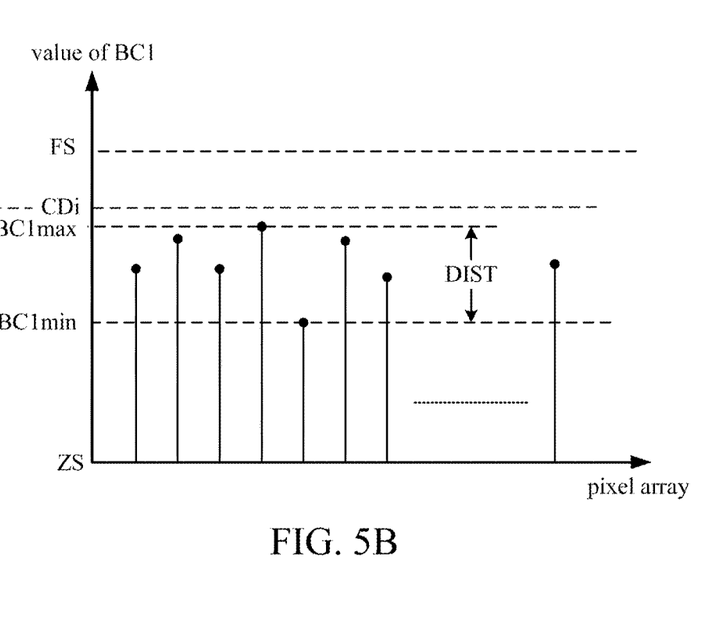
FIG. 5B is a schematic diagram illustrating the first fingerprint brightness codes generated in reference with the first ramp voltage signal in FIG. 3A during the pre-scanning phase.

In other embodiments, the control method 200 can count the ramp-counting variable RC in a descending order. Reference is further made to FIG. 5A and FIG. 5B. FIG. 5A is a schematic diagram illustrating a first ramp voltage signal Vramp1$d$ generated according to the ramp-counting variable RC varying in the descending order within the full range Rf during the pre-scanning phase. FIG. 5B is a schematic diagram illustrating the first fingerprint brightness codes BC1 generated in reference with the first ramp voltage signal Vramp1$d$ in FIG. 5A during the pre-scanning phase.

As shown in FIG. 5A, the digital counter 122 counts the ramp-counting variable RC in the descending order started from the full scale FS to the zero scale ZS. The ramp converter 124 generates the first ramp voltage signal Vramp1$d$ with varying voltage levels positively correlated to the ramp-counting variable RC in the descending order. The readout circuit 160 compares optical-sensing voltage signals Scol1-Scoln with the first ramp voltage signal Vramp1$d$ for detecting the first fingerprint brightness codes BC1 as shown in FIG. 5B.

In the embodiments shown in FIG. 5B, the initial code CDi is generated according to a maximal code BC1max among the first fingerprint brightness codes BC1 detected during the pre-scanning phase. As shown in FIG. 5B, the initial code CDi can be set at the maximal code BC1max plus a buffer gap. In some other embodiments, the initial code CDi can be equal to the maximal code BC1max.

Figure 6A:
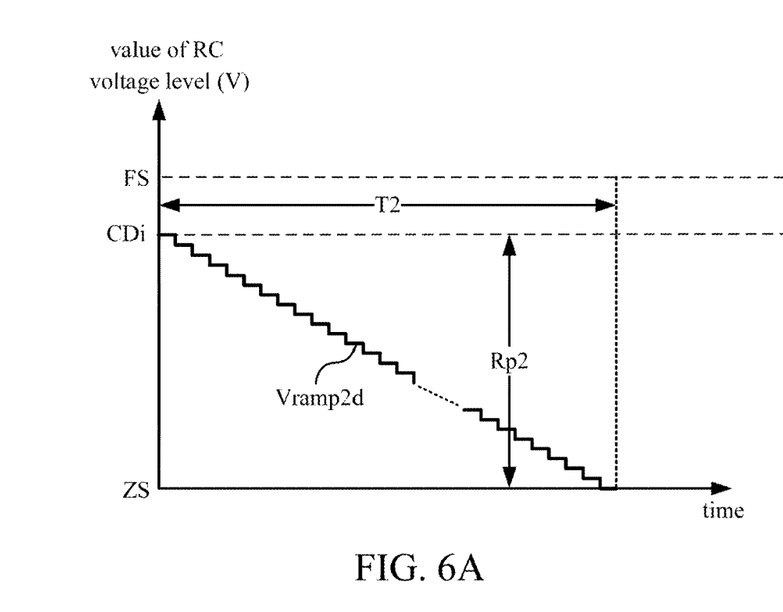
FIG. 6A is a schematic diagram illustrating a second ramp voltage signal generated according to the ramp-counting variable varying in a partial range during the normal scanning phase.

Reference is further made to FIG. 6A, which is a schematic diagram illustrating a second ramp voltage signal Vramp2 generated according to the ramp-counting variable RC varying in a partial range Rp2 during the normal scanning phase.

As shown in FIG. 6A, during the normal scanning phase, the digital counter 122 counts the ramp-counting variable RC in the descending order started from the initial code CDi to the zero scale ZS in the partial range Rp2. The ramp converter 124 generates a second ramp voltage signal Vramp2$d$ with varying voltage levels positively correlated to the ramp-counting variable RC in the descending order within the partial range Rp2.

Figure 6B:
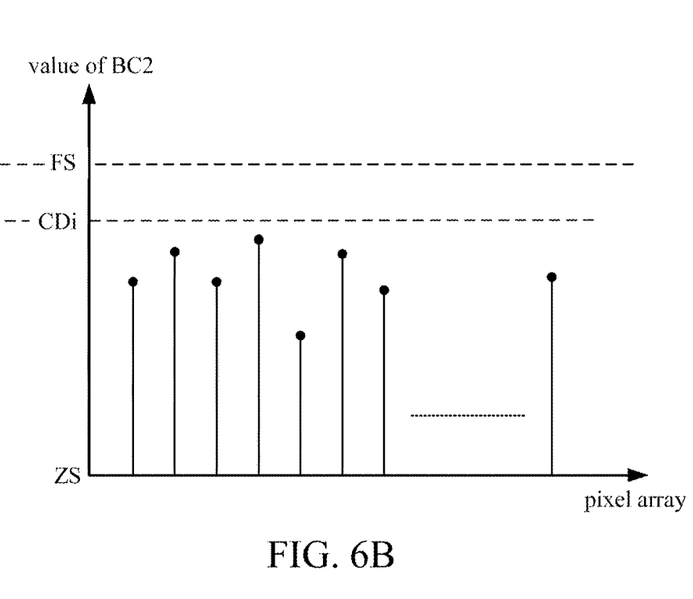
FIG. 6B is a schematic diagram illustrating the second fingerprint brightness codes generated during the normal scanning phase in some embodiments.

The ramp converter 124 provides the second ramp voltage signal Vramp2$d$ to the readout circuit 160, such that the readout circuit 160 compares the optical-sensing voltage signals Scol1-Scoln with the second ramp voltage signal Vramp2$d$ for detecting the second fingerprint brightness codes BC2. Reference is further made to FIG. 6B, which is a schematic diagram illustrating the second fingerprint brightness codes BC2 generated during the normal scanning phase.

In some embodiments, during the normal scanning phase, the ramp-counting variable RC can be counted starting from the initial code CDi instead of starting from the full scale FS. In this case, a cycle time T2, for the second ramp voltage signal Vramp2$d$ varying in the partial range Rp2 in FIG. 6A, is shorter than a cycle time T1, for the first ramp voltage signal Vramp1$d$ varying in the full range Rf in FIG. 5A. Therefore, it is more time efficient in the normal scanning phase by utilizing the second ramp voltage signal Vramp2$d$ varying in the partial range Rp2.

Figure 7A:
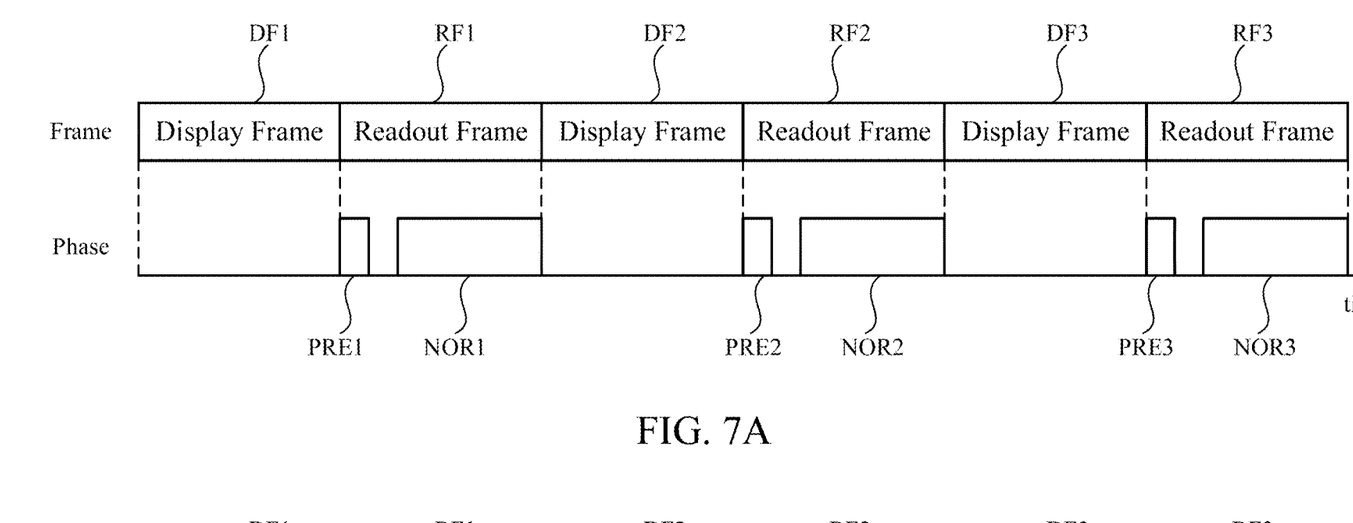
FIG. 7A is a time diagram illustrating the display function and the fingerprint sensing function performed on the electronic device.

In some embodiments, the pixel array 140 in the electronic device 100 can be a touch-display panel, which integrates the fingerprint sensing function with a display function. In some embodiments, the pixel array 140 may perform the display function and the fingerprint sensing function alternatively over time. Reference is further made to FIG. 7A, which is a time diagram illustrating the display function and the fingerprint sensing function performed on the electronic device 100. As shown in FIG. 7A, there are display frames (DF1, DF2 and DF3) and readout frames (RF1, RF2 and RF3), alternatively executed on the electronic device 100. As shown in embodiments of FIG. 7A, each one of consecutive readout frames RF1, RF2 and RF3 includes the pre-scanning phase and the normal scanning phase. For example, the readout frame RF1 includes the pre-scanning phase PRE1 and the normal scanning phase NOR1; the readout frame RF2 includes the pre-scanning phase PRE2 and the normal scanning phase NOR2; the readout frame RF3 includes the pre-scanning phase PRE3 and the normal scanning phase NOR3.

In some embodiments, the initial code generated in the pre-scanning phase in one of the consecutive readout frames determines the partial range in the normal scanning phase in the same one of the consecutive readout frames. For example, the initial code CD1 generated in the pre-scanning phase PRE1 determines the partial range in the normal scanning phase NOR1. The initial code CD2 generated in the pre-scanning phase PRE2 determines the partial range in the normal scanning phase NOR2. The initial code CD3 generated in the pre-scanning phase PRE3 determines the partial range in the normal scanning phase NOR3.

Figure 7B:
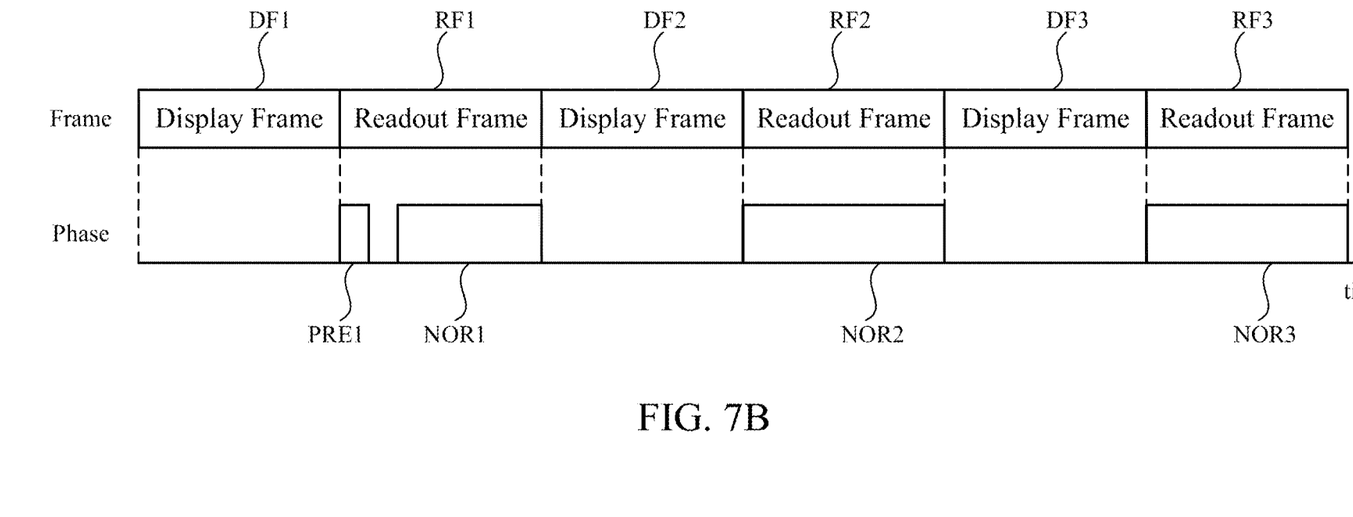
FIG. 7B is another time diagram illustrating the display function and the fingerprint sensing function performed on the electronic device according to other embodiments.

Reference is further made to FIG. 7B, which is another time diagram illustrating the display function and the fingerprint sensing function performed on the electronic device 100 according to other embodiments. As shown in FIG. 7B, there are display frames (DF1, DF2 and DF3) and readout frames (RF1, RF2 and RF3), alternatively executed on the electronic device 100. As shown in embodiments of FIG. 7B, the readout frame RF1 includes the pre-scanning phase and the normal scanning phase, and the following readout frames RF2 and RF3 include the normal scanning phase without pre-scanning phase. For example, the readout frame RF1 includes the pre-scanning phase PRE1 and the normal scanning phase NOR1; the readout frame RF2 includes the normal scanning phase NOR2; the readout frame RF3 includes the normal scanning phase NOR3.

In some embodiments, the initial code generated in the pre-scanning phase PRE1 in the readout frame RF1 determines the partial ranges in the normal scanning phases NOR1-NOR3 of the readout frames RF1-RF3. In other words, the normal scanning phases NOR1-NOR3 share the initial code generated in the pre-scanning phase PRE1.

In aforesaid embodiments, during the normal scanning phase, the ramp-counting variable RC varies in the partial range (e.g., Rp1 in FIG. 4A or Rp2 in FIG. 6A) started from the initial code CDi for speeding up the fingerprint sensing. However, the disclosure is not limited to thereto. In other embodiments, the ramp-counting variable RC can be counted at different clock frequencies in different parts of the full ranges for speeding up the fingerprint sensing.

Figure 8:
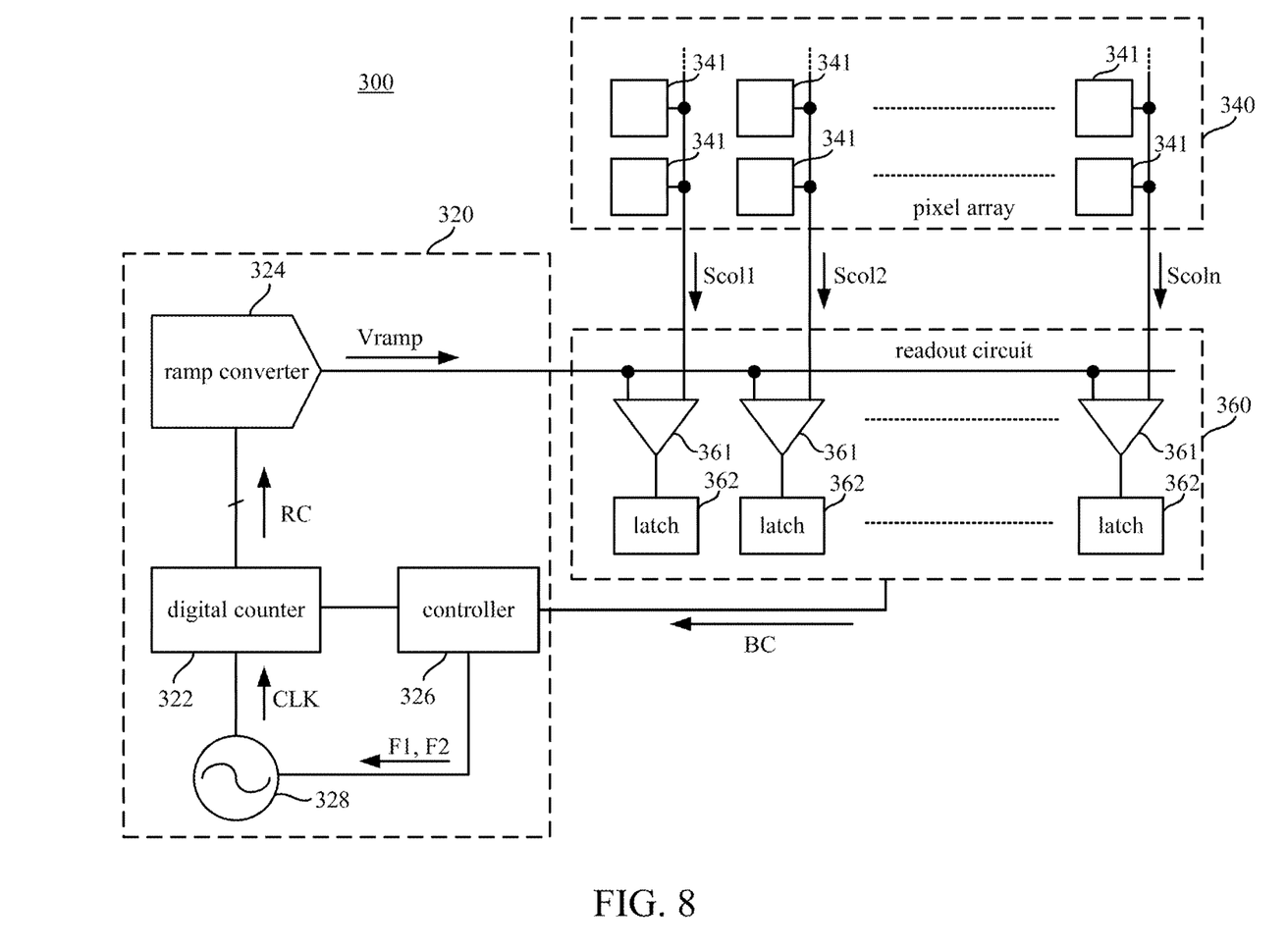
FIG. 8 is a schematic diagram illustrating a control circuit according to some embodiments of the disclosure.

FIG. 8 is a schematic diagram illustrating a control circuit 320 according to some embodiments of the disclosure. In some embodiments, the control circuit 320 is suitable for an electronic device 300 capable for sensing a fingerprint image.

As embodiments shown in FIG. 8, the electronic device 300 includes a pixel array 340 and a readout circuit 360. The pixel array 340 includes several optical sensors 341 arranged on different columns, and the optical sensors 341 are configured to generate optical-sensing voltage signals Scol1, Scol2 . . . Scoln. The readout circuit 360 is coupled with the optical sensors 341 in the pixel array 340. The readout circuit 360 is configured to compare the optical-sensing voltage signals Scol1-Scoln respectively with a ramp voltage signal Vramp for detecting fingerprint brightness codes BC. Details about the pixel array 340 and the readout circuit 360 in FIG. 8 are similar to the the pixel array 140 and the readout circuit 160 in FIG. 1, and not repeated here.

As shown in FIG. 8, the control circuit 320 is configured to generate the ramp voltage signal Vramp, and provide the ramp voltage signal Vramp to the readout circuit 360. The control circuit 320 includes a digital counter 322, a ramp converter 324, a controller 326 and an oscillator 328.

The digital counter 322 is configured to count a ramp-counting variable RC according to a clock frequency CLK generated by the oscillator 328. In embodiments shown in FIG. 8, the clock frequency CLK can be adjusted to have different clock frequencies, e.g., a clock frequency F1 and another frequency F2, controlled by the controller 326. The ramp-counting variable RC is increased or decreased by the digital counter 322.

The ramp converter 324 is coupled with the digital counter 322. The ramp converter 324 is configured to generate the ramp voltage signal Vramp with varying voltage levels positively correlated to the ramp-counting variable RC. For example, when the ramp-counting variable RC is larger, the ramp voltage signal Vramp has a higher voltage level; when the ramp-counting variable RC is smaller, the ramp voltage signal Vramp has a lower voltage level. In some embodiments, the ramp converter 324 is a digital-to-analog converter (DAC) configured to convert a digital count value (i.e., the ramp-counting variable RC) into an analog voltage signal (i.e., the ramp voltage signal Vramp).

In an example, the ramp-counting variable RC is counted in a full range (started from 0, 1, 2, 3, 4 . . . until the full scale) such that the ramp voltage signal Vramp is generated in the full range from the lowest voltage level to the highest voltage level, as a reference voltage standard for detecting the fingerprint brightness codes BC. In most of cases, the fingerprint brightness codes BC does not distribute over the full range, and the fingerprint brightness codes BC are usually detected within a partial region (e.g., from 75 to 150) within the full range (e.g., from 0 to 255). It is not time efficient to detect the fingerprint brightness codes BC with the ramp-counting variable RC at the same frequency in the full range.

In some embodiments, the controller 326 is configured to generate an initial code CDi and trigger the digital counter 322 to count the ramp-counting variable RC within different clock frequencies (i.e., the clock frequency F1 and the clock frequency F2) according to the initial code CDi. In this case, the controller 326 can speed up the process of detecting the fingerprint brightness codes BC on the electronic device 300. Details about how to generate the initial code CDi and count the ramp-counting variable RC within different clock frequencies will be discussed in the following paragraphs.

Figure 9:
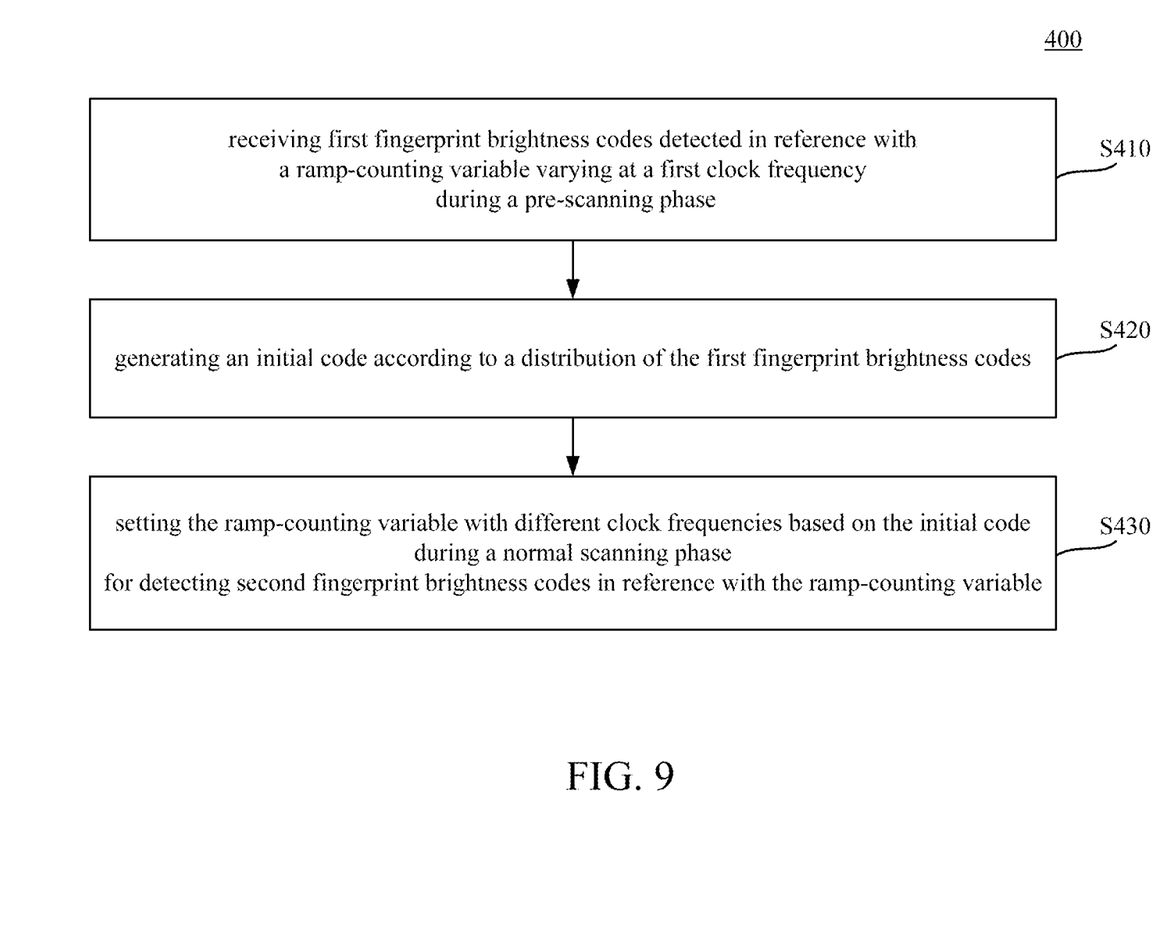
FIG. 9, which is a flow chart illustrating a control method in some embodiments of the disclosure.

Reference is made to FIG. 9, which is a flow chart illustrating a control method 400 in some embodiments of the disclosure. The control method 400 can be executed by the control circuit 320 shown in FIG. 8.

According to the control method 400, a readout frame of detecting the fingerprint brightness codes BC may include a pre-scanning phase and a normal scanning phase after the pre-scanning phase. During the pre-scanning phase, step S410 is performed, the control circuit 320 receives first fingerprint brightness codes detected in reference with a ramp-counting variable RC varying at a first clock frequency in a full range during a pre-scanning phase.

Figure 10A:
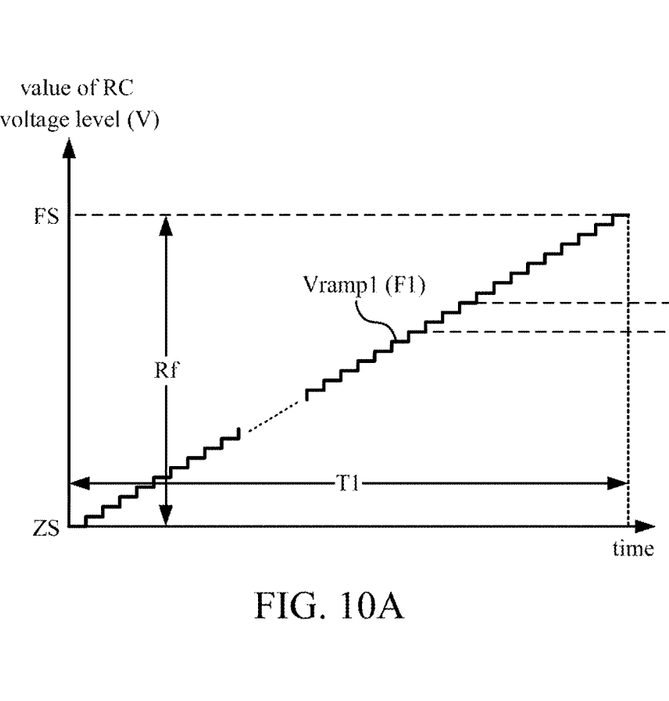
FIG. 10A is a schematic diagram illustrating a first ramp voltage signal generated by the electronic device during the pre-scanning phase.

Reference is further made to FIG. 10A, which is a schematic diagram illustrating a first ramp voltage signal Vramp1 generated according to the ramp-counting variable RC varying at the first frequency F1 in the full range Rf by the electronic device 300 during the pre-scanning phase.

During the pre-scanning phase, the controller 326 triggers the digital counter 322 to count the ramp-counting variable RC varying in the full range Rf at the first frequency F1 during the pre-scanning phase. In the embodiment shown in FIG. 3, the digital counter 322 count the ramp-counting variable RC in an ascending order started from a zero scale "0" to a full scale FS. The digital counter 322 provides the ramp-counting variable RC to the ramp converter 324. The ramp converter 324 generates the first ramp voltage signal Vramp1 as shown in FIG. 10A with varying voltage levels positively correlated to the ramp-counting variable RC in the full range FS. The ramp converter 324 provides the first ramp voltage signal Vramp1 to the readout circuit 360. The comparators 361 in the readout circuit 360 compares optical-sensing voltage signals Scol1-Scoln with the first ramp voltage signal Vramp1, and comparison results from the comparators 361 are stored in the latches 362 for generating the first fingerprint brightness codes BC1.

Figure 10B:
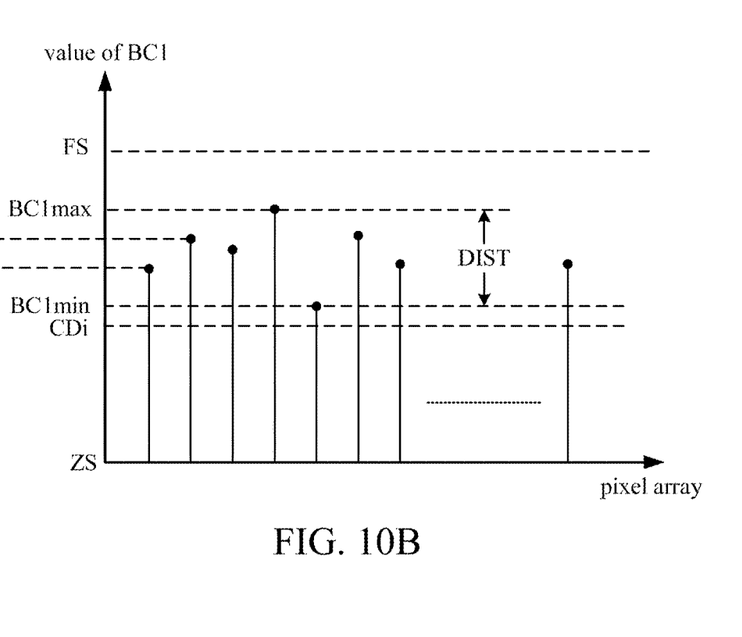
FIG. 10B is a schematic diagram illustrating the first fingerprint brightness codes generated in reference with the first ramp voltage signal in FIG. 10A during the pre-scanning phase.

Reference is made to FIG. 10B, which is a schematic diagram illustrating the first fingerprint brightness codes BC1 generated in reference with the first ramp voltage signal Vramp1 in FIG. 3A during the pre-scanning phase.

As shown in FIG. 8, FIG. 9 and FIG. 10B, step S420 is performed by the control circuit 320 after receiving the first fingerprint brightness codes BC1, the controller 326 generates an initial code CDi according to the distribution DIST of the first fingerprint brightness codes BC1. Details about generating the initial code CDi according to the distribution DIST in embodiments in FIG. 10B are similar to the embodiments discussed in FIG. 3B, and not repeated here.

Figure 11A:
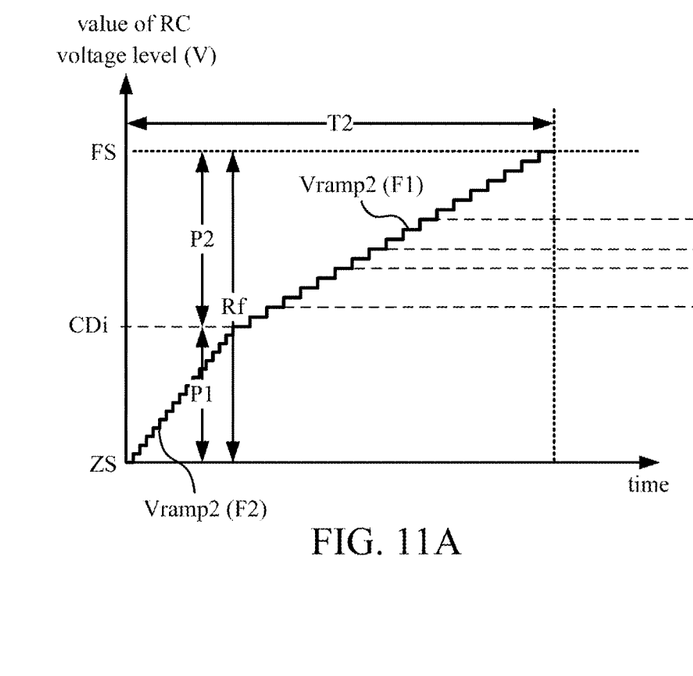
FIG. 11A is a schematic diagram illustrating a second ramp voltage signal generated during the normal scanning phase.

As shown in FIG. 8 and FIG. 9, step S430 is performed, by the control circuit 320, during a normal scanning phase, the control circuit 120 apply the initial code CDi to the ramp-counting variable RC for detecting second fingerprint brightness codes BC2 in reference with the ramp-counting variable RC with different clock frequencies F1 and F2. Reference is further made to FIG. 11A, which is a schematic diagram illustrating a second ramp voltage signal Vramp2 generated according to the ramp-counting variable RC with different clock frequencies F1 and F2 during the normal scanning phase.

The ramp-counting variable RC varies at a second clock frequency F2 in a first portion P1 before the initial code CDi within the full range Rf, and the ramp-counting variable RC varies at the first clock frequency F1 in a second portion P2 after the initial code CDi within the full range Rf. The second clock frequency F2 is higher than the first clock frequency F1.

As shown in FIG. 11A, a boundary between the first portion P1 and the second portion P2 is determined according to the initial code CDi. In other words, the digital counter 322 counts the ramp-counting variable RC at a higher frequency (i.e., the second frequency F2) before the initial code CDi and counts the ramp-counting variable RC at a regular frequency (i.e., the first frequency F1) after the initial code CDi to the full scale.

The digital counter 322 provides the ramp-counting variable RC to the ramp converter 324. The ramp converter 324 generates a second ramp voltage signal Vramp2 as shown in FIG. 11A with varying voltage levels positively correlated to the ramp-counting variable RC with two different clock frequencies. The ramp converter 324 provides the second ramp voltage signal Vramp2 to the readout circuit 360. The comparators 361 in the readout circuit 360 compares optical-sensing voltage signals Sco1-Scoln with the second ramp voltage signal Vramp2, and comparison results from the comparators 361 are stored in the latches 362 for generating the second fingerprint brightness codes BC2.

Figure 11B:
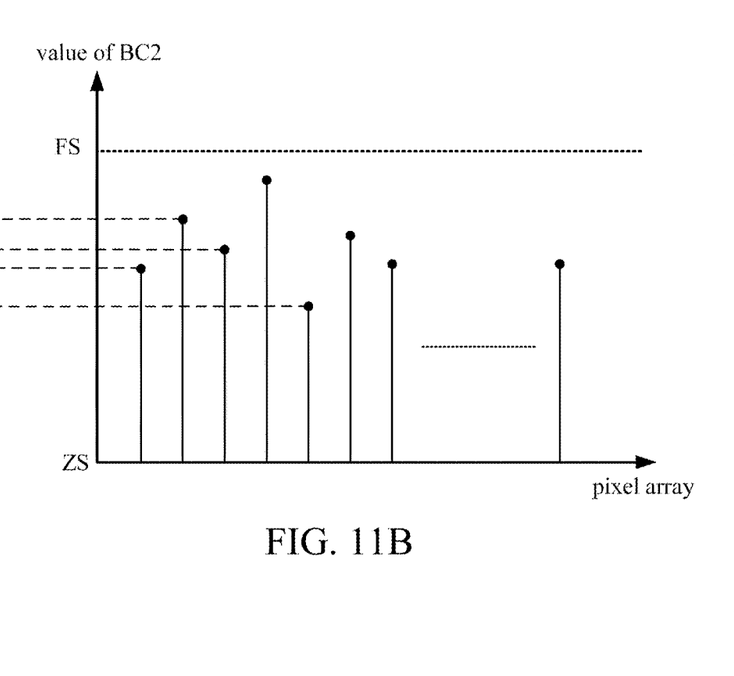
FIG. 11B is a schematic diagram illustrating the second fingerprint brightness codes generated during the normal scanning phase in some embodiments.

In some embodiments, during the normal scanning phase, the ramp-counting variable RC is counted at a higher frequency (i.e., the second clock frequency F2) in the first portion P1 before the initial code CDi and at a regular frequency (i.e., the first clock frequency F1). In this case, a cycle time T2, for the second ramp voltage signal Vramp2 in FIG. 11A, is shorter than a cycle time T1, for the first ramp voltage signal Vramp1 in FIG. 10A. Therefore, it is more time efficient in the normal scanning phase by utilizing the second ramp voltage signal Vramp2 varying with two clock frequencies F1 and F2. FIG. 11B is a schematic diagram illustrating the second fingerprint brightness codes BC2 generated during the normal scanning phase in some embodiments.

In embodiments shown in FIG. 10A to FIG. 11B, the ramp-counting variable RC is counted in the ascending order, and the disclosure is not limited thereto. In other embodiments, the ramp-counting variable RC can be counted in the descending order. How to change from the ascending order into the descending order has been discussed between embodiments shown in FIG. 3A~FIG. 4B and FIG. 5A~FIG. 6B, and similarly the descending order can also be utilized in the ramp-counting variable RC with different clock frequencies, and not discussed here again. Accordingly, the ramp-counting variable RC can be counted at different clock frequencies F1 and F2 in different portions P1 and P2 of the full ranges Rf for speeding up the fingerprint sensing.

To sum up, the present disclosure surveys a control device and a control method which can determine an initial code CDi according to the distribution DIST of the first fingerprint brightness codes BC1 detected during the pre-scanning phase. Therefore, the initial code is determined dynamically according to a current user and a current situation detected in the pre-scanning phase. Therefore, the control method can generate the second fingerprint brightness codes quickly and accurately corresponding to different user's fingerprint and different situations.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control method of fingerprint sensing, comprising:
receiving a plurality of first fingerprint brightness codes detected in reference with a ramp-counting variable varying in a full range during a pre-scanning phase;
generating an initial code according to a distribution of the first fingerprint brightness codes; and
applying the initial code to the ramp-counting variable during a normal scanning phase for detecting a plurality of second fingerprint brightness codes in reference with the ramp-counting variable varying in a partial range, wherein a boundary of the partial range is determined according to the initial code.

2. The control method of claim 1, wherein the first fingerprint brightness codes is detected by:
counting the ramp-counting variable in an ascending order by a digital counter started from a zero scale to a full scale;
generating a first ramp voltage signal with varying voltage levels positively correlated to the ramp-counting variable; and
comparing a plurality of optical-sensing voltage signals with the first ramp voltage signal for detecting the first fingerprint brightness codes.

3. The control method of claim 2, wherein the initial code is generated according to a minimal code among the first fingerprint brightness codes detected during the pre-scanning phase.

4. The control method of claim 3, wherein applying the initial code to the ramp-counting variable comprising:
counting the ramp-counting variable in the ascending order by the digital counter started from the initial code to the full scale; and
generating a second ramp voltage signal with varying voltage levels positively correlated to the ramp-counting variable;
wherein the second fingerprint brightness codes is detected by comparing the optical-sensing voltage signals with the second ramp voltage signal.

5. The control method of claim 1, wherein the first fingerprint brightness codes is detected by:
counting the ramp-counting variable in a descending order by a digital counter started from a full scale to a zero scale;

generating a first ramp voltage signal with varying voltage levels positively correlated to the ramp-counting variable; and comparing a plurality of optical-sensing voltage signals with the first ramp voltage signal for detecting the first fingerprint brightness codes.

6. The control method of claim 5, wherein the initial code is generated according to a maximal code among the first fingerprint brightness codes detected during the pre-scanning phase.

7. The control method of claim 6, wherein applying the initial code to the ramp-counting variable comprising:

counting the ramp-counting variable in the descending order by the digital counter started from the initial code to the zero scale; and generating a second ramp voltage signal with varying voltage levels positively correlated to the ramp-counting variable;

wherein the second fingerprint brightness codes is detected by comparing the optical-sensing voltage signals with the second ramp voltage signal.

8. The control method of claim 1, wherein each one of consecutive readout frames comprises the pre-scanning phase and the normal scanning phase, and the initial code generated in the pre-scanning phase in one of the consecutive readout frames determines the partial range in the normal scanning phase in the same one of the consecutive readout frames.

9. The control method of claim 1, wherein a first one of consecutive readout frames comprises the pre-scanning phase and the normal scanning phase, and the initial code generated in the pre-scanning phase in the first one of consecutive readout frames determines the partial range in the normal scanning phase in each of the consecutive readout frames.

10. A control method of fingerprint sensing, comprising:

receiving a plurality of first fingerprint brightness codes detected in reference with a ramp-counting variable varying at a first clock frequency in a full range during a pre-scanning phase;

generating an initial code according to a distribution of the first fingerprint brightness codes detected during the pre-scanning phase; and setting the ramp-counting variable with different clock frequencies based on the initial code during a normal scanning phase for detecting a plurality of second fingerprint brightness codes in reference with the ramp-counting variable, wherein the ramp-counting variable varies at a second clock frequency in a first portion before the initial code within the full range, the ramp-counting variable varies at the first clock frequency in a second portion after the initial code within the full range, the second clock frequency is higher than the first clock frequency.

11. The control method of claim 10, wherein the first fingerprint brightness codes is detected by:

counting the ramp-counting variable at the first clock frequency in an ascending order by a digital counter started from a zero scale to a full scale;

generating a first ramp voltage signal with varying voltage levels positively correlated to the ramp-counting variable; and comparing a plurality of optical-sensing voltage signals with the first ramp voltage signal for detecting the first fingerprint brightness codes.

12. The control method of claim 11, wherein the initial code is generated according to a minimal code among the first fingerprint brightness codes detected during the pre-scanning phase.

13. The control method of claim 12, wherein setting the ramp-counting variable during the normal scanning phase comprising:

counting the ramp-counting variable at the second clock frequency in the ascending order started from the zero scale to the initial code, and counting the ramp-counting variable at the first clock frequency in the ascending order by the digital counter started from the initial code to the full scale; and generating a second ramp voltage signal with varying voltage levels positively correlated to the ramp-counting variable;

wherein the second fingerprint brightness codes is detected by comparing the optical-sensing voltage signals with the second ramp voltage signal.

14. The control method of claim 10, wherein the first fingerprint brightness codes is detected by:

counting the ramp-counting variable at the first clock frequency in a descending order by a digital counter started from a full scale to a zero scale;

generating a first ramp voltage signal with varying voltage levels positively correlated to the ramp-counting variable; and comparing a plurality of optical-sensing voltage signals with the first ramp voltage signal for detecting the first fingerprint brightness codes.

15. The control method of claim 14, wherein the initial code is generated according to a maximal code among the first fingerprint brightness codes detected during the pre-scanning phase.

16. The control method of claim 15, wherein setting the ramp-counting variable during the normal scanning phase comprising:

counting the ramp-counting variable at the second clock frequency in the descending order by the digital counter started from the full scale to the initial code, and counting the ramp-counting variable at the first clock frequency in the descending order by the digital counter started from the initial code to the zero scale; and generating a second ramp voltage signal with varying voltage levels positively correlated to the ramp-counting variable;

wherein the second fingerprint brightness codes is detected by comparing the optical-sensing voltage signals with the second ramp voltage signal.

17. The control method of claim 10, wherein each one of consecutive readout frames comprises the pre-scanning phase and the normal scanning phase, and the initial code generated in the pre-scanning phase in one of the consecutive readout frames determines a boundary between the first portion and the second portion in the normal scanning phase in the same one of the consecutive readout frames.

18. The control method of claim 10, wherein a first one of consecutive readout frames comprises the pre-scanning phase and the normal scanning phase, and the initial code generated in the pre-scanning phase in the first one of consecutive readout frames determines a boundary between the first portion and the second portion in the normal scanning phase in each of the consecutive readout frames.

19. A control circuit, suitable for an electronic device comprising a plurality of optical sensors and a readout circuit, the optical sensors being configured to generate a plurality of optical-sensing voltage signals, the readout circuit being configured to compare the optical-sensing voltage signals respectively with a ramp voltage signal for detecting a plurality of fingerprint brightness codes, the control circuit comprising:
- a digital counter configured to count a ramp-counting variable;
- a ramp converter, coupled with the digital counter, and the ramp converter being configured to generate the ramp voltage signal with varying voltage levels positively correlated to the ramp-counting variable;
- a controller, coupled with the digital counter and the readout circuit, the controller being configured to:
  - trigger the digital counter to count the ramp-counting variable varying in a full range during a pre-scanning phase;
  - receive a plurality of first fingerprint brightness codes from the readout circuit in reference with the ramp-counting variable varying in the full range during the pre-scanning phase;
  - generate an initial code according to a distribution of the first fingerprint brightness codes detected during the pre-scanning phase;
  - trigger the digital counter to count the ramp-counting variable in a partial range during a normal scanning phase, wherein a boundary of the partial range is determined according to the initial code; and
  - receive a plurality of second fingerprint brightness codes from the readout circuit in reference with the ramp-counting variable varying in the partial range during the normal scanning phase.

20. A control circuit, suitable for an electronic device comprising a plurality of optical sensors and a readout circuit, the optical sensors being configured to generate a plurality of optical-sensing voltage signals, the readout circuit being configured to compare the optical-sensing voltage signals respectively with a ramp voltage signal for detecting a plurality of fingerprint brightness codes, the control circuit comprising:
- a digital counter configured to count a ramp-counting variable;
- a ramp converter, coupled with the digital counter, and the ramp converter being configured to generate the ramp voltage signal with varying voltage levels positively correlated to the ramp-counting variable;
- a controller, coupled with the digital counter and the readout circuit, the controller being configured to:
  - trigger the digital counter to provide a ramp-counting variable varying at a first clock frequency in a full range during a pre-scanning phase;
  - receive a plurality of first fingerprint brightness codes from the readout circuit in reference with the ramp-counting variable varying in the full range during the pre-scanning phase;
  - generate an initial code according to a distribution of the first fingerprint brightness codes detected during the pre-scanning phase;
  - trigger the digital counter to count the ramp-counting variable varying at a second clock frequency in a first portion before the initial code within the full range and count the ramp-counting variable varying at the first clock frequency in a second portion after the initial code within the full range during a normal scanning phase; and
  - receive a plurality of second fingerprint brightness codes from the readout circuit in reference with the ramp-counting variable during the normal scanning phase.

* * * * *